United States Patent [19]
Van Order et al.

[11] Patent Number: 5,529,367
[45] Date of Patent: Jun. 25, 1996

[54] VISOR WITH SLIDING PIVOT MOUNT

[75] Inventors: Kim L. Van Order, Hamilton; Jerry M. De Jong, West Olive, both of Mich.

[73] Assignee: Prince Corporation, Holland, Mich.

[21] Appl. No.: 180,548

[22] Filed: Jan. 12, 1994

[51] Int. Cl.⁶ .................................................. B60J 3/02
[52] U.S. Cl. ................................. 296/97.11; 296/97.8
[58] Field of Search .............................. 296/97.11, 97.9, 296/97.8

[56] References Cited

U.S. PATENT DOCUMENTS

| | | | |
|---|---|---|---|
| 1,461,289 | 7/1923 | Primrose | 296/97.11 |
| 1,894,233 | 1/1933 | Ellis | 296/97.11 X |
| 1,995,969 | 3/1935 | Donnelly | 296/97.11 |
| 2,559,471 | 7/1951 | Schrock | 296/97.11 |
| 2,829,003 | 4/1958 | Moyes . | |
| 3,403,937 | 10/1968 | Quaine | 296/97.11 |
| 4,227,241 | 10/1980 | Marcus . | |
| 4,674,789 | 6/1987 | Watjer et al. . | |
| 4,679,842 | 7/1987 | Hwang-Change | 296/97.11 |
| 4,925,233 | 5/1990 | Clark . | |
| 4,988,139 | 1/1991 | Yamada | 296/97.11 X |
| 4,989,910 | 2/1991 | Mersman et al. . | |
| 5,031,952 | 7/1991 | Miyamoto et al. | 296/97.11 X |
| 5,040,840 | 8/1991 | Kokeisl | 296/97.11 X |
| 5,071,186 | 12/1991 | Hemmeke et al. . | |
| 5,292,168 | 3/1994 | Mykytiuk et al. | 296/97.8 |
| 5,328,227 | 7/1994 | Pax, Jr. et al. | 296/97.8 |

FOREIGN PATENT DOCUMENTS

| | | | |
|---|---|---|---|
| 1407244 | 6/1965 | France | 296/97.11 |
| 3136494 | 3/1983 | Germany . | |
| 499444 | 1/1939 | United Kingdom | 296/97.11 |

Primary Examiner—Joseph D. Pape
Attorney, Agent, or Firm—Price, Heneveld, Cooper, DeWitt & Litton

[57] ABSTRACT

A visor body is mounted to a pivot rod which in turn is mounted to a slide assembly positioned above a vehicle headliner. The headliner includes an opening at its forward end adjacent the windshield for concealably receiving the visor body and a longitudinally extending slot through which the pivot rod extends when the visor is moved to a lowered use position and rotated to a side window position. The slide assembly permits the visor body to be moved forwardly and rearwardly in either the front window or side window positions for providing selective sun blocking coverage.

14 Claims, 3 Drawing Sheets

5,529,367

VISOR WITH SLIDING PIVOT MOUNT

BACKGROUND OF THE INVENTION

The present invention relates to vehicle visors and particularly to a mounting system for attaching a visor to a vehicle.

Visors are conventionally mounted to a vehicle roof by a pivot mounting assembly which allows the visor to pivot about the axis of a pivot rod to which the visor is mounted for raising and lowering the visor. The opposite end of the pivot rod typically is mounted to a bracket which allows the pivot rod to rotate within the bracket such that a lowered visor can be moved to a side window position. Most visors thus provide coverage for either the windshield or side window positions in a vehicle. Multiple visors are also available which include two visor panels to provide simultaneous front and side window protection with some such systems also providing a side window visor which slides along an axle for selectable side window protection. U.S. Pat. No. 5,071,186 discloses such a visor system.

Also there has been proposed a visor which, like a conventional visor, can be pivoted from a raised stored position to a lowered front windshield use position and subsequently moved to a side window position but further can slide along its pivot rod to provide adjustable side and front window protection. U.S. Pat. No. 4,925,233 discloses such a system.

Further there have been numerous visors which have been concealed behind the vehicle headliner and subsequently slide forwardly and pivot downwardly for front windshield protection. U.S. Pat. No. 4,989,910 discloses such a visor which also includes a pivoted auxiliary panel. Thus visors have been concealed behind the headliner which slide out for use and there has been suggested visors which are pivotally mounted to provide both front and side window protection as well as some adjustability.

SUMMARY OF THE PRESENT INVENTION

The visor of the present invention includes a visor body mounted to a pivot rod which in turn is mounted to a slide assembly positioned above the headliner. The headliner includes an opening at its forward end adjacent the windshield for concealably receiving the visor body and a longitudinally extending slot through which the pivot rod extends when the visor is moved to a lowered use position and rotated to a side window position. The slide assembly permits the visor body to be moved forwardly and rearwardly in either the front window or side window positions for providing selective sun blocking coverage.

Thus the visor of the present invention provides a concealed visor which provides both front and side window protection and one which also allows adjustability along the side window as well as movement closer or farther away from the user. When the visor includes a vanity mirror, adjustability toward and away from the face of the user when the visor is in the front position is particularly advantageous. These and other features, objects and advantages of the present invention will become apparent upon reading the following description thereof together with reference to the accompanying drawings in which:

DETAILED DESCRIPTION OF THE PREFERRED EMBODIMENT

Figure 1:
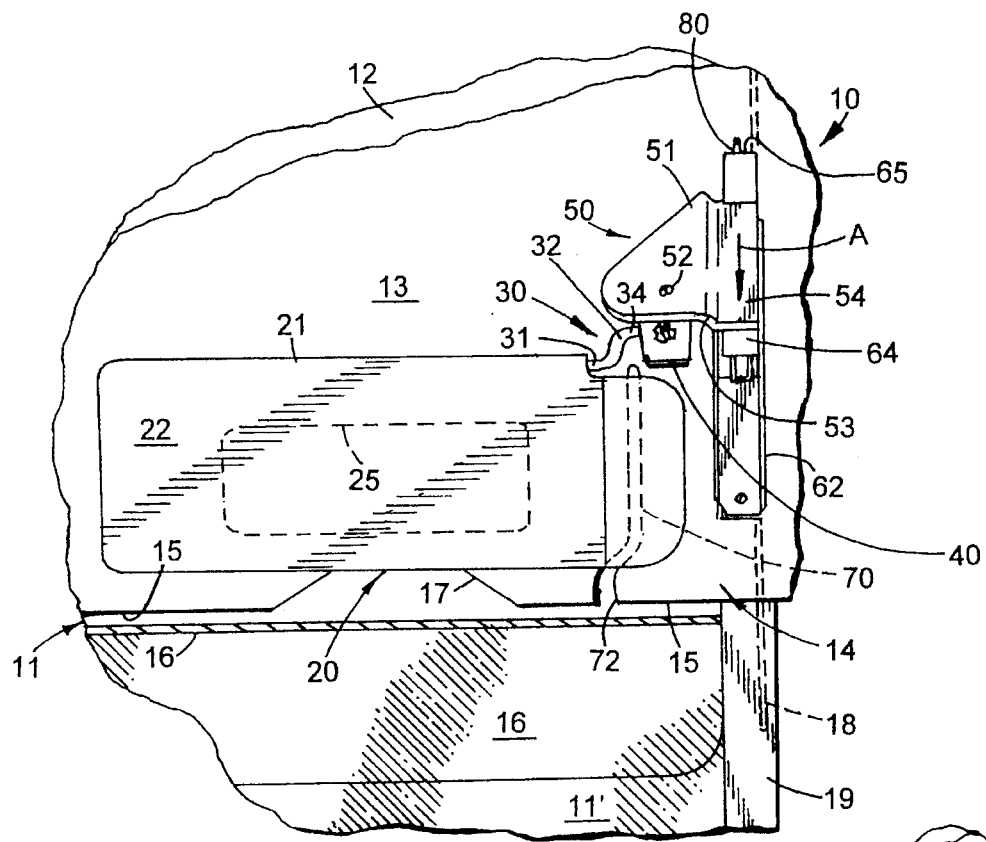
FIG. 1 is a fragmentary perspective view, partly broken away, from a direction above the driver's side and outside the vehicle showing a visor of the present invention mounted to the driver's side of the vehicle and shown in a retracted stored position behind the headliner.
Figure 2:
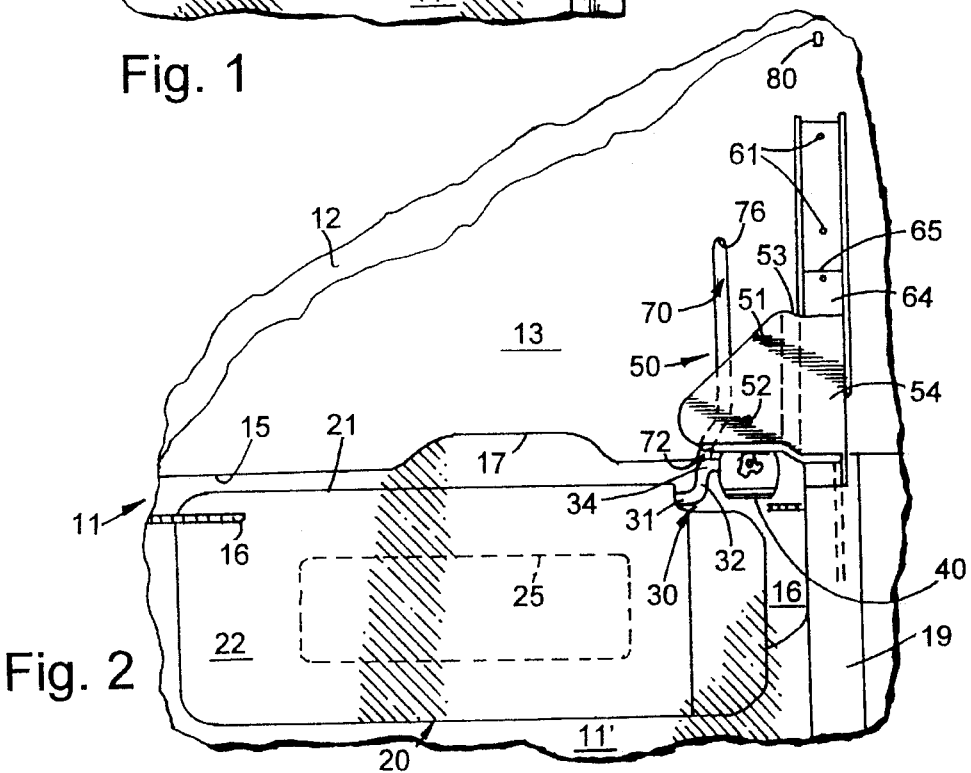
FIG. 2 is the same view of the visor shown in FIG. 1 but shown in a partially extended position.
Figure 3:
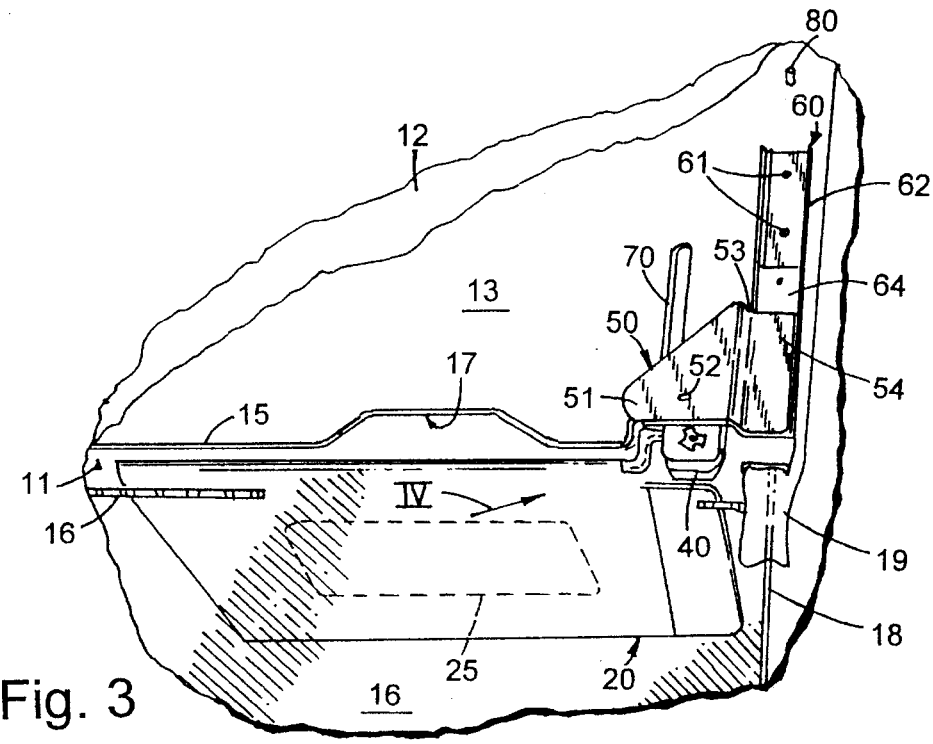
FIG. 3 is the same view of the visor shown in FIGS. 1 and 2 with the visor shown in a lowered front window position.
Figure 5:
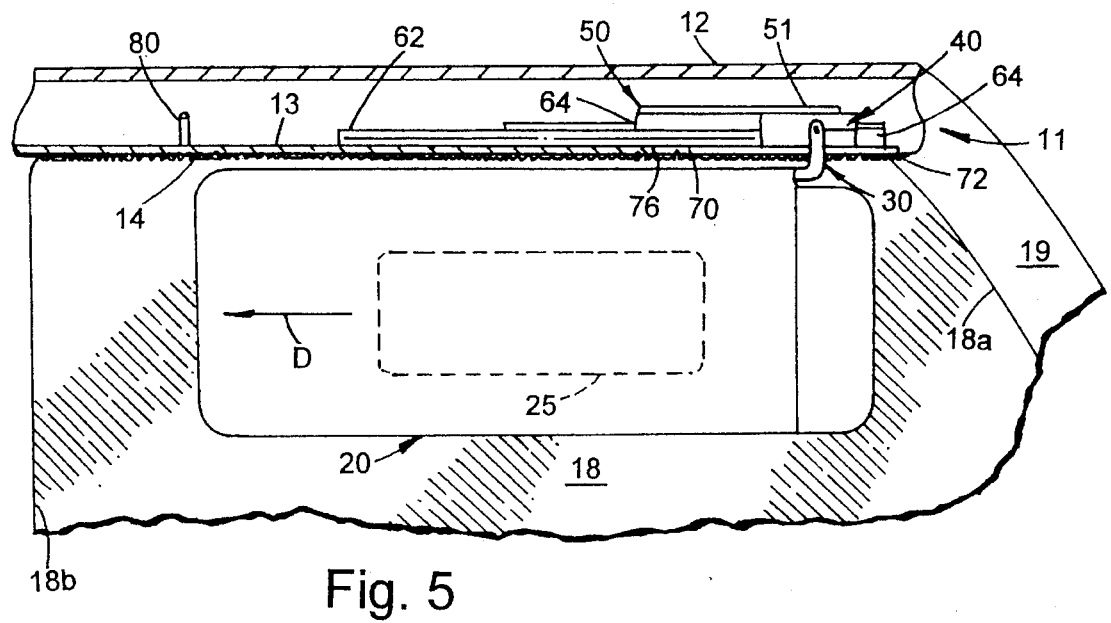
FIG. 5 is a side elevational view, partly in cross-section, of the visor shown in FIGS. 1–4 showing the visor pivoted to a side window position in the direction indicated by Arrow C in FIG. 4.
Figure 6:
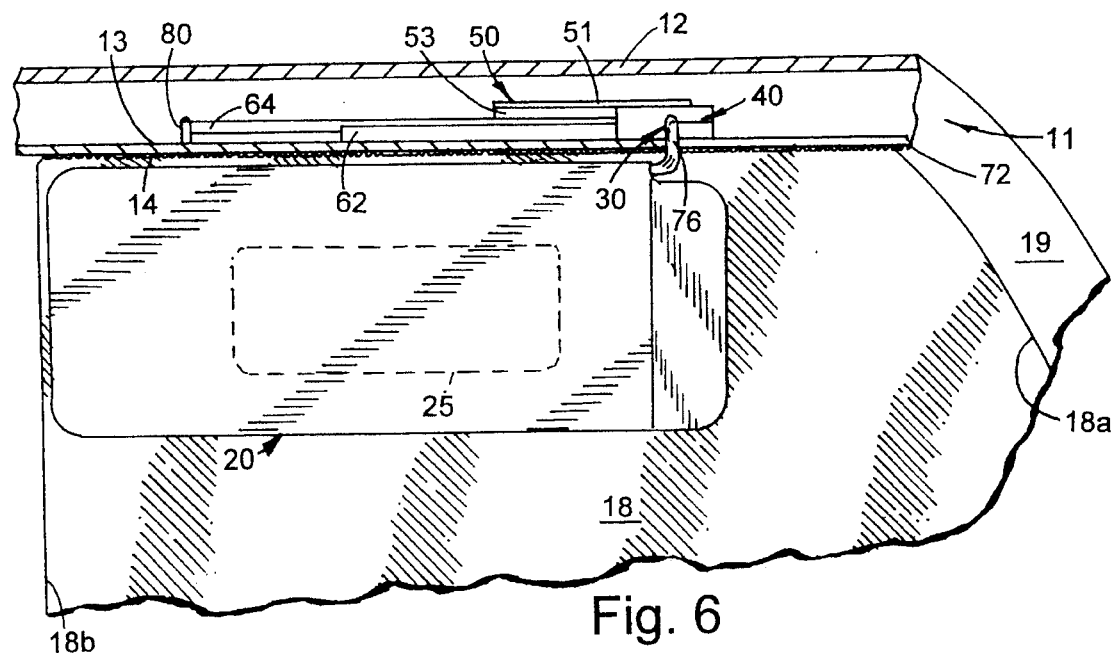
FIG. 6 is a side elevational view of the visor shown in FIG. 5 moved rearwardly along the side window in the direction indicated by Arrow D in FIG. 5.

Referring initially to FIGS. 1–3 there is shown a vehicle 10 such as an automobile. In these FIGS. the outer roof 12 is broken-away exposing the upper surface 13 of the vehicle headliner 14 and the visor assembly 20 of the present invention. The headliner 14 terminates along a forward edge 15 thereof adjacent the windshield 16 of the vehicle. An opening 11 extends between the forward edge 15 of the headliner 14 and the inside of windshield 16 and between the upper surface 13 of the headliner and the lower surface of the metal roof 12 sufficient to provide clearance for storage of the visor assembly 20 and its movement to and extended use position. The space between the roof and headliner is best seen in FIGS. 5 and 6. The leading edge 15 of the headliner 14 includes a slot 17 (FIGS. 1–3) allowing the user to grasp a stored visor for extending the visor from the stored position shown in FIG. 1 to an initially extended position as shown in FIG. 2. The vehicle includes an instrument panel 11' seen in FIGS. 1–2 and an A-pillar 19 extends between the windshield 16 and side window 18.

Figure 4:
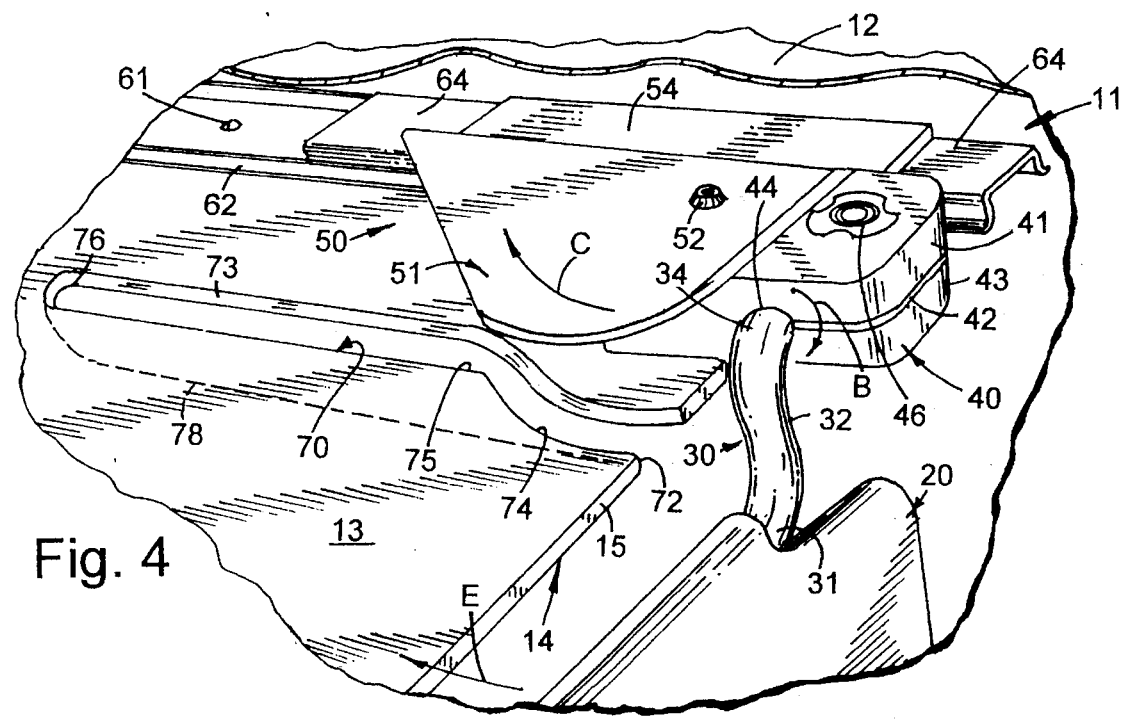
FIG. 4 is a an enlarged fragmentary perspective view of the visor mounting structure taken in the direction of Arrow IV in FIG. 3.

The visor assembly 20 comprises a visor body 22 mounted to a slide assembly 50 by a pivot rod 30 such that the visor can slide from a stored position above the headliner to a use position and subsequently be lowered for use. A slot 70 in the headliner permits the visor to be pivoted to a side window position where the slide assembly allows translation of the visor to an adjustable side window positions as illustrated in FIGS. 5 and 6. Slot 70 can be enlarged as seen at 78 in FIG. 4 to allow the visor 20 to move directly rearwardly when in a front facing position as seen in FIG. 4 by arrow E which is helpful in both adjusting the visor for sun blocking as well as adjusting the distance from the user to a vanity mirror 25 (shown in phantom form) which can be mounted to the visor. This unique movement of a visor is achieved by the mounting system of the present invention which is now described in greater detail with reference initially to FIGS. 1–3.

The visor 20 includes a visor body 22 which can be made of a polymeric material in the form of a folded core construction covered by a suitable upholstery or any other current visor body manufacturing technique. Extending from the upper edge 21 of the visor body 22 in the corner adjacent the side window 18 of the vehicle is a generally Z-shaped pivot axle 30 having a first leg 31 fixedly mounted to the top edge 21 of visor body 22, an intermediate leg 32 which extends generally vertically when the visor is in a lowered use position as shown in FIGS. 3–6 and an end 34 which extends within a pivot block 40 forming part of the slide assembly for the visor.

The pivot block 40, as best seen in FIG. 4, is made of a polymeric material such as Nylon and includes a bore 44 for receiving end 34 of the pivot rod 30. A horizontally extending slot 42 extends from the bore to the edge of pivot block 40 and a recessed compression fastener 46 such as a nut and bolt combination extends vertically through an aperture in the ends 41 and 43 of the block defined by slot 42. The fastener 46 compresses ends 41 and 43 adjacent bore 44 to grip end 34 of pivot rod 30 within bore 44 to provide a predetermined rotational torque between pivot rod end 34 and block 40. The lowering of the visor from a generally horizontally extending position shown in FIG. 2 around the axis of end 34 of the pivot rod is in a direction indicated by Arrow B in FIG. 4 which shows the visor in a first use position. In other embodiments, the block 40 may be molded to the end 34 of pivot rod to provide the desired rotational torque for controlling the visor movement.

The pivot block 40 in turn is pivotally mounted to a horizontally extending generally triangular plate 51 of the slide assembly 50 by means of a vertically extending pivot pin 52 which extends through the plate and the block 40 on a side opposite bore 44 from fastener 46. Plate 51 includes downwardly inclined leg 53 terminating in a flange 54 which mounts to a movable slide 64 of a slide mechanism 60 defined by slide 64 and track 62. Track 62 is secured to the upper surface 13 of the headliner 14 using fasteners 61 to extend in generally parallel relationship to the side window 18. Slide 60 may be a conventional drawer-type slide which is commercially available. The slide assembly 50 allows the visor assembly 20 to slide from the stored position with the rear edge 65 of slide 64 engaging a stop 80 as shown in FIG. 1 forwardly in a direction indicated by Arrow A in FIG. 1 to a first extended position as illustrated in FIG. 2. The visor can then be lowered and further translated and pivoted to desired use positions.

As best seen in FIG. 4, the headliner 14 includes a configured slot 70 which has an open mouth 72 immediately adjacent the vertical leg 32 of pivot axle 30 and which curves inwardly at 74 in a radius of curvature corresponding to the radius between pivot axle 52 and the center of axle section 32 such that the visor assembly 20 can be rotated rearwardly in a direction indicated by Arrow C in FIG. 4 such that the vertical section 32 of pivot rod 30 extends within slot 70 and initially through the open mouth 72 and through the curved section 74. When the visor has been moved to a side window blocking position as shown in FIG. 5, the pivot rod is initially located in a position identified by reference numeral 75 in FIG. 4. Subsequently, the slide assembly 50 allows the visor assembly 22 to be translated rearwardly in a direction indicated by Arrow D in FIG. 5 along the remaining length 73 (FIG. 4) of slot 70 which extends generally in parallel spaced relationship to the side window 18 of the vehicle. The visor can move to the end 76 (FIG. 4) of slot 70 to the position shown in FIG. 6 or any intermediate position therealong. The friction between slide member 64 and track 62 holds the visor in the desired adjusted position.

Slot 70 may be enlarged as shown in phantom at 78 in FIG. 4 to permit not only the rotation of the lowered visor 20 to the side window position but also the translation of the forward facing visor directly rearwardly as indicated by arrow E in FIG. 4. This allows the vehicle occupant to use a vanity mirror 25 shown schematically in phantom form in FIGS. 1–3 and adjust the distance of the mirror from the face of the user as desired for optimum use of the mirror. Mirror 25 may be selectively covered and illuminated as disclosed in U.S. Pat. No. 4,227,241 the disclosure of which is incorporated herein by reference. Slot 70 can be filled with a resiliently deflectable material such as brush-like bristles mounted to the upper surface 13 of the headliner and extending inwardly from opposite edges of the slot to provide a decorative closure to the slot if desired and still permit the passage of the vertical section 32 of pivot rod 30 between the selected use positions shown in FIGS. 5 and 6.

Thus with the visor system of the present invention, a visor which is concealed above the vehicle headliner 14 and which is mounted in a slide assembly for initial extension and subsequent lowering and rotation to a side window position and again translation rearwardly is provided utilizing relatively inexpensive mounting components to provide a reliable and yet fully adjustable visor system. It will become apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A visor assembly for a vehicle comprising:

a visor body;

a pivot mount coupled to said visor body such that said visor body can be pivoted along orthogonal axes, wherein said pivot mount includes a pivot mounting block and a pivot rod extending between said visor body and said pivot mounting block, and wherein said pivot rod is generally Z-shaped with one end coupled to said visor body and an opposite end coupled to said pivot mounting block; and a slide assembly for coupling said pivot mount to a vehicle to allow said visor to pivot between a raised stored position and at least two lowered use positions, with one use position adjacent the vehicle's windshield and a second use position adjacent a side window, and wherein said visor body can translate along said slide assembly when in either of said use positions.

2. The visor assembly as defined in claim 1 wherein said slide assembly includes a track for mounting to the vehicle and a sliding plate slideably mounted to said track, wherein said pivot mounting block is mounted to said sliding plate.

3. A visor assembly for a vehicle comprising:

a visor body;

a pivot mounting block and a pivot rod extending between said visor body and said pivot mounting block for permitting said visor body to be pivoted along orthogonal axes, wherein said pivot rod is generally Z-shaped with one end coupled to said visor body and an opposite end coupled to said pivot mounting block; and a slide assembly for coupling said pivot mounting block to a vehicle to allow said visor to pivot and translate, wherein said slide assembly includes a track for mounting to the vehicle and a sliding plate slideably mounted to said track, and wherein said pivot mounting block is pivotally mounted to said sliding plate.

4. The visor assembly as defined in claim 3 wherein said visor body includes a vanity mirror.

5. The visor assembly as defined in claim 4 and further including a headliner for a vehicle and wherein said track is mounted to an upper surface of said headliner, said headliner including a slot for the passage of said pivot rod.

6. A vehicle visor assembly comprising:

a slide assembly for mounting above the headliner of a vehicle;

a visor body;

a pivot rod coupling said visor body to said slide assembly for pivoting said visor body along generally orthogonal axes, and translating said visor along said slide assembly; and a headliner positioned below said slide assembly, said headliner including a slot for the passage of said pivot rod therethrough, such that said visor body can be moved from above the headliner to an extended use position and subsequently moved to a side window position and translated rearwardly for adjustment along the side window of a vehicle.

7. The visor as defined in claim 6 wherein said slide assembly includes a pivot rod mounting block for pivotally receiving an end of said pivot rod remote from said visor, and a sliding plate coupling said pivot block to said headliner.

8. The visor as defined in claim 7 wherein said visor body includes an illuminated vanity mirror assembly.

9. A visor assembly for mounting above a headliner of a vehicle for concealed storage and which can be slideably moved from behind the headliner to a windshield or side window use positions comprising:

a slide assembly for mounting to a vehicle above the headliner of a vehicle;

a visor body and a pivot rod pivotally coupling said visor body to said slide assembly for movement in orthogonal planes when extended from behind the headliner; and a headliner including a slot through which said pivot rod extends for providing clearance for said pivot rod as said visor is translated in a direction along said slide assembly.

10. A visor system for a vehicle comprising:

a headliner for attachment in spaced relationship to a vehicle roof, said headliner including a slot therein for receiving a visor pivot rod;

a slide assembly mounted to an upper surface of said headliner;

a pivot rod having one end pivotally mounted to said slide assembly; and a visor body mounted to an opposite end of said pivot rod such that said visor body can be pivoted between a raised stored position and a lowered use position, whereby said pivot rod extends into said slot of said headliner such that said visor body can be translated in a lineal direction by said slide assembly.

11. The visor assembly as defined in claim 10 wherein said slide assembly includes a pivot rod mounting block for pivotally receiving an end of said pivot rod remote from said visor body.

12. The visor assembly as defined in claim 11 wherein said visor body includes a vanity mirror.

13. The visor assembly as defined in claim 11 wherein said visor includes an illuminated vanity mirror.

14. The visor assembly as defined in claim 11 wherein said slide assembly includes a track and a slide slideably mounted to said track and wherein said visor rod is mounted to said slide for pivotable movement about mutually orthogonal axes.

* * * * *